July 26, 1966 D. WILLISON ETAL 3,262,729
CARGO CONTAINER AND LIFTING EQUIPMENT THEREFOR
Filed Dec. 20, 1963 3 Sheets-Sheet 1
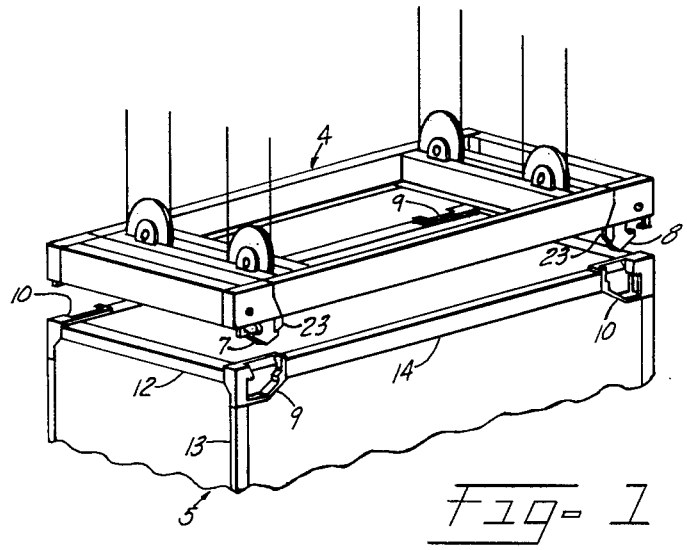
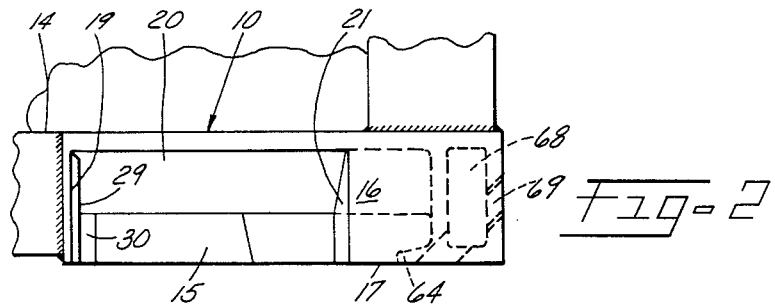
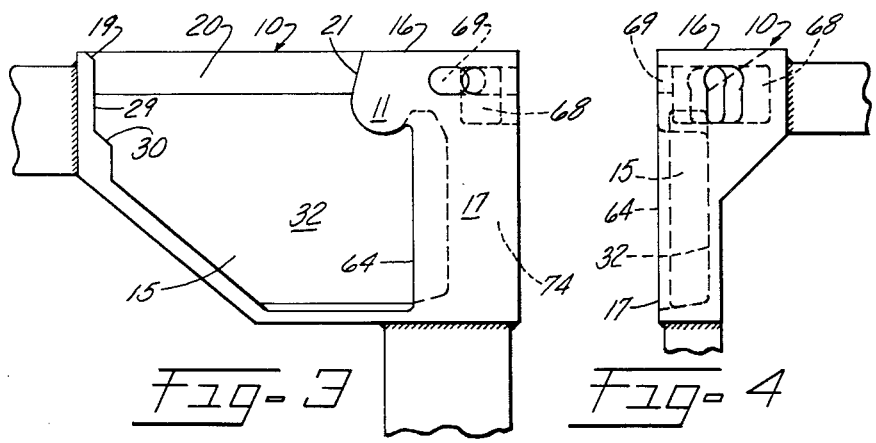
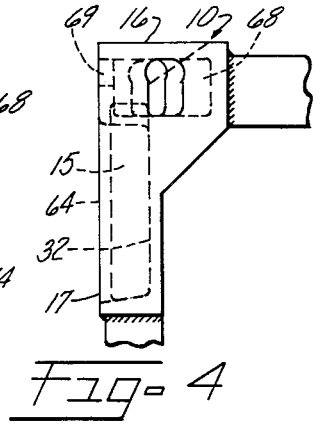
INVENTORS
DONALD WILLISON
JOSEPH BROWN
BY
*Henry Kozak*
ATTORNEY July 26, 1966 D. WILLISON ETAL 3,262,729
CARGO CONTAINER AND LIFTING EQUIPMENT THEREFOR
Filed Dec. 20, 1963 3 Sheets-Sheet 2
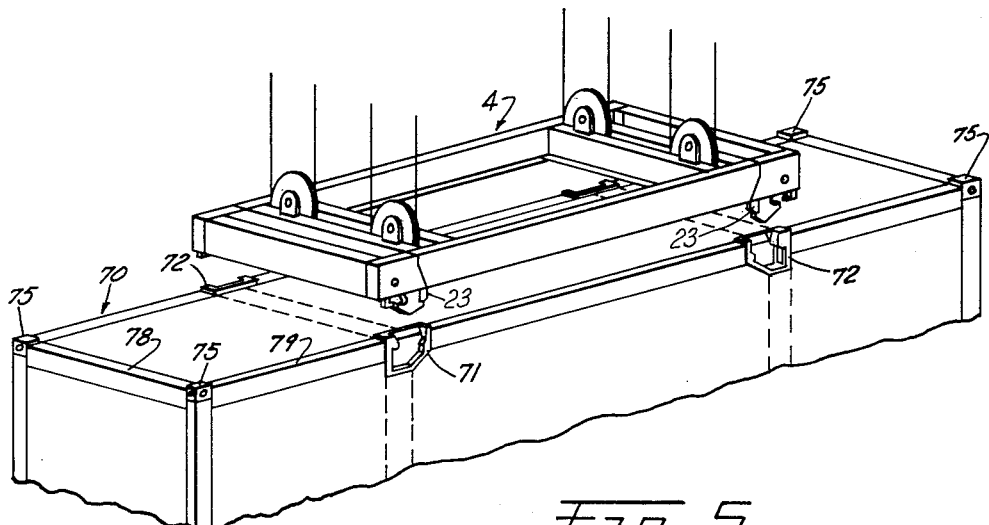
Fig-5
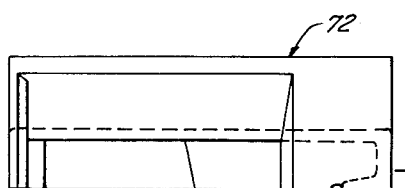
Fig-6
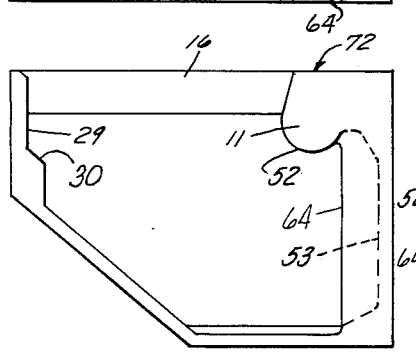
Fig-7    Fig-8
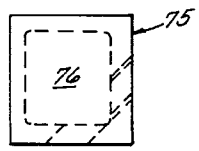
Fig-9
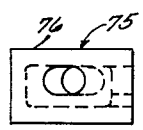 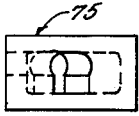
Fig-10  Fig-11
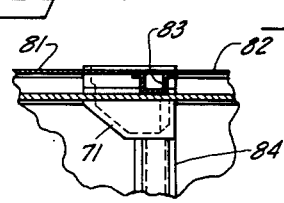
Fig-12
INVENTORS
DONALD WILLISON
JOSEPH BROWN
BY
*Henry Kozak*
ATTORNEY July 26, 1966    D. WILLISON ETAL    3,262,729
CARGO CONTAINER AND LIFTING EQUIPMENT THEREFOR
Filed Dec. 20, 1963    3 Sheets-Sheet 3
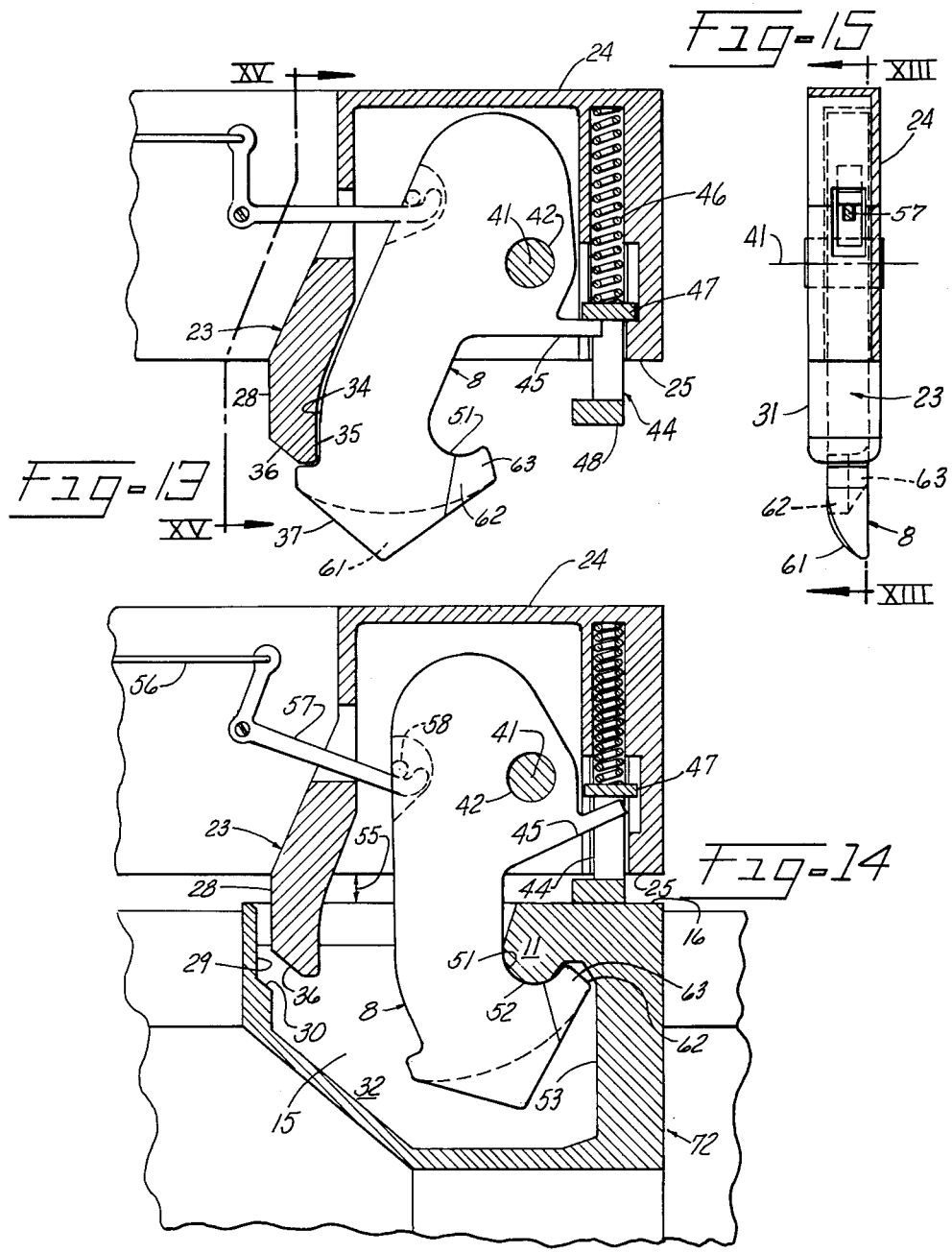
INVENTORS
DONALD WILLISON
JOSEPH BROWN
BY
Henry Kozak
ATTORNEY

United States Patent Office 3,262,729
Patented July 26, 1966

3,262,729
CARGO CONTAINER AND LIFTING
EQUIPMENT THEREFOR
Donald Willison, Lyndhurst, and Joseph Brown, Cleveland, Ohio, assignors, by mesne assignments, to Midland-Ross Corporation, Cleveland, Ohio, a corporation of Ohio
Filed Dec. 20, 1963, Ser. No. 332,182
6 Claims. (Cl. 294—81)

This invention relates to cargo containers and equipment automatically connecting therewith for hoisting and transferring the containers from one storage or hauling facility to another. Such facilities include freight docks, freight terminals, railway flat cars, motor trucks, ship decks or holds, highway trucks and aircraft.

Present efforts to reduce manual handling of freight are resulting in rapid development of the industrial art known as cargo containerization, e.g., in arrangements for connecting containers and hoisting equipment. To date connecting mechanisms of satisfactory thinness have not been devised which substantially conform to wall or frame thicknesses of cargo container walls and thus prevent intrusion into the lading space of the container, or projection beyond the outer contour of the container. Thin connectors are desirable since one of the aspects of containerization development is to obtain container-hoist connections located in a standard pattern regardless of the size of the container. A standard pattern is particularly desired in view of the trend toward cargo containers of greater lengths.

Neglecting length of the moment, a desirable pickup arrangement for a container resides in cooperating construction of a container and a hoisting implement (extensively known as a "spreader") therefor which enables coupling of the container and the implement at the extreme upper corners of the container. This simplifies the frame construction of the container and avoids undesirable protrusions into the lading space amidships of the container which occurs if connecting devices are housed in the upper portion of the container intermediately of its ends.

However, as the lengths of cargo containers are extended, the length of the implement or spreader must be correspondingly extended. Hence, a spreader of one length is not suitable for handling containers of different lengths unless it is of such mechanical complexity as to be longitudinally adjustable. In any event, the adoption by the shipping industries of containers of different sizes brings to light various disadvantages of present lifting systems.

Accordingly, there is a great need for a spreader-container connecting arrangement that will avoid, e.g., the cost, lading, space encroachment, complexities of container and hoisting equipment construction, or weaknesses of container construction inherent in the devices and mechanisms presently known to the art when applied to the problem of using a single hoisting implement of fixed length to lift containers of different sizes.

Thus, it is the principal object of the invention to provide cargo-container and lifting equipment therefor embodying improvements enabling the hoisting equipment to be built to a standard identical construction and the container, regardless of its size, to be built with an upper portion of standard design adapting it to be connected with the hoisting equipment.

In furtherance of the above object, container components are to be provided which do not appreciably project either into the normal lading space of a container or outwardly of the exterior contour of the container. That is to say, such components would be substantially included within the thickness of the container walls.

Another object is to provide cargo-container and lifting equipment therefor consistent with the foregoing objects which permits lifting forces imposed on the container by the equipment to be directed on the container in a vertical plane containing, as nearly as practical, the neutral axes of the longitudinal vertical walls of the container or container frame members therein.

In spite of the thinness of the intercoupling of the components of the container and the hoisting equipment which this invention provides, it is also an object to provide these components in a form causing the hoisting implement to effect vertical alignment with the container preparatory to coupling.

Briefly stated, the invention resides in a cargo container and a hoisting implement or spreader used therewith wherein the implement comprises an elongate frame member and a flat lifting latch, such as a hook member, extending downwardly from the frame member with a vertical plane of flatness established by the horizontal thickness and width of the member. For receiving each latch, the container comprises a frame having a longitudinal member extending along the intersection of a vertical wall and a top wall of the container; a socket integrally contained in the cargo member and provided with a pocket opening along adjacent normally top and side surfaces of the container to render the implement self-aligning with respect to the container. In order to contain the socket within the widthwise direction of the container member or a side wall including such member, the socket and the pocket thereof have horizontal depth and width of which the width is substantially greater. The horizontal depth of the socket conforms substantially to the width of the frame member to prevent substantial protrusion of the socket into the lading space of the container. The horizontal depth of the pocket conforms substantially to the thickness of the projection to avoid material protrusion of the latch from the open side of the pocket during use. The greater horizontal dimension or width of the pocket is larger than that of the projection to assure its passage into and out of the pocket. The latch and the socket have portions which interlock within the pocket for coupling the spreader to the container. This relationship of the dimensions of the latch and the pocket disposes a lifting force exerted by the latch in approximate vertical alignment with a neutral axis for lateral bending forces of a vertical frame member extending downward from the pocket engaged by the latch.

In the drawings with respect to which the invention is described below:

FIG. 1 is a fragmentary perspective view illustrating a hoisting implement or spreader in uncoupled overhead relation with the top portion of a container.

FIG. 2 is a plan view of an upper corner portion of the container of FIG. 1 showing a corner socket constituting a component of the container.

FIGS. 3 and 4 are side and end elevations, respectively, of the socket illustrated in FIG. 2.

FIG. 5 is a fragmentary perspective view of the spreader of FIG. 1 in centered position over a container of considerably greater length than the spreader and comprising sockets of modified design.

FIG. 6 is a plan view of a socket incorporated in the frame structure of the container of FIG. 5.

FIGS. 7 and 8 are side and end elevations, respectively of the socket illustrated in FIG. 6.

FIGS. 9, 10, and 11 are plan view, side elevation, and end elevation, respectively, of a top corner block for uniting frame members of the container of FIG. 5.

FIG. 12 is a fragmentary elevation in section along a longitudinal vertical plane of the container of FIG. 5, illustrating a socket of the type incorporated in the container of FIG. 5.

FIG. 13 is an elevation in section on line XIII—XIII of FIGURE 15 of a spreader connector as viewed with a side wall of a housing portion thereof removed, and a latch member thereof in position for entering a container socket.

FIG. 14 is an elevation in section of the connector shown in FIG. 13 in coupled relation with a socket of the type shown in FIGS. 6 to 8 with side walls of both the connector and the socket removed.

FIG. 15 is an elevation in section taken along line XV—XV of FIG. 13 providing an end view of the connectors shown in FIGS. 13 and 14.

Two major embodiments of the invention are described herein. The first is described with respect to FIGS. 1 to 4 and FIGS. 13 and 14. A hoisting implement or spreader 4, and features of the intercoupling mechanism of FIGS. 13 and 14, are common to both embodiments. The second embodiment refers more particularly to modified container pockets and to subject matter illustrated in FIGS. 5 to 12 as well as FIGS. 13 and 14.

To proceed with the first embodiment, the spreader 4 is shown suspended over a container 5 with four projections or latches 7 and 8 thereof in vertical alignment with sockets 9 and 10 included integrally in the structure of the container. Provision of different numerals for the sockets is occasioned by the fact that they must be constructed in "rights" and "lefts." This is also true of the latches as shown in FIG. 1. The sockets 9 and 10 occur in the upper corners of the container at the intersection of primary frame members, e.g., members 12, 13, and 14 which extend along the various intersections of the side and top wall of the container. The sockets 9, 10 are integrally attached to the frame members, merge therewith, and thus become key structural components of the container.

As the similarities and differences between "right" and "left" types of sockets should be obvious, one of the "right" type sockets 10 is portrayed in FIGS. 2, 3, and 4 by way of example. Easily observed in FIGS. 2 and 3 is that the socket provides a pocket which opens along the top surface 16 of the socket and along its outer side surface 17. As the figures further show, the socket is open along its outer side substantially the full depth of the pocket and otherwise sufficiently open for horizontal passage of the latch into the pocket from a position outside the socket. Thus, the latch may enter the pocket from a sidewise as well as a top side position to facilitate the self-aligning function of implement 4 with respect to the container 5.

The pocket 15 is of irregular contour adapting it to receive and entrap the lower hook portion of the latch 8 over a downwardly projecting lobe 11 as shown in FIG. 14. The top portion of the pocket tapers downwardly from the top surface 16 along three sides, as defined by top peripheral bevel surfaces 19, 20, and 21. These surfaces cooperate with the lower V-shaped end surface of the projection 8 as the spreader 4 moves into engagement with the container, to automatically position the spreader over the container and thus facilitate entry of the latches into respective sockets. As the outer side of the pocket is open, a latch moving horizontally into the pocket 15 from a laterally outward position attains proper alignment as a latch and socket at the opposite side of the spreader and container engage, i.e., the latch 7 and a surface of the socket 9 corresponding to the surface 20 of the socket 10 engage on the opposite side of the container.

Gathering the spreader relative to the container is further augmented by a downwardly extending guide arm 23 of a housing 24 enclosing the upper portion of the latch 8. The arm 23 extends substantially below the undersurface 15 of the housing and the spreader as a whole in order that it may be normally positioned in the upper portion of the pocket of the socket when coupled with the latch.

In addition to its gathering function, the arm 23 and those of the other latch housings of the spreader cooperate with respective sockets which they penetrate to limit movement of the spreader relative to the container in any horizontal direction. That is to say, a vertical surface 28 of the arm faces in the amidship longitudinal direction of the spreader and the container. The arm 23 is disposed between the associated latch and the amidship region of the spreader but in proximity with the latch. Thus, when disposed in the pocket 15, the arm engages, or may move in the amidship direction of the container to engage a vertical inward surface 29 of the pocket. A surface 30 inclines downwardly and inwardly relative to the pocket 15 from the lower end of the surface 29 to allow a lower inclined surface 36 of the arm 23 to engage therewith in final adjusting movements of the spreader into position for latching with the container pockets. However, the surface 30 is spaced from the top surface 10 to permit the housing undersurface 25 to "bottom" on the pocket top surface 16.

An important function of the arm 23 is to cooperate with the surfaces 29 of a container in establishing a centered relation of the spreader 4 with the container avoiding positioning of any retracted latches under its corresponding mating lobe, such as lobe 11.

Arms and sockets at the opposite ends of the container thus function to limit relative longitudinal movement in both horizontal directions. In a similar manner, a side surface 31 of the arm of each housing faces toward a central longitudinal axis of the spreader or the container and is disposed in normally close clearance with an inner vertical side surface 32 of the socket and, on slight movement of the spreader transversely of the container, the arm surface 31 engages the socket surface 32. With the various extensions of latch housings entered in respective sockets, transverse relative movement of the spreader in the container is precluded.

The guide arms 23 function in still another manner. As shown in FIG. 13, the latch is backstopped by the arm with the amidships facing surface 34 of the latch 8 engaging a lateral surface 35 on the side of the arm 23 facing outwardly of the spreader. Surfaces 34 and 35 are preferably complementary in order to provide advantageous contours of the arm and the latch for respective functions, and to provide a continuous gathering surface along the underside of the arm and the latch when back-to-back.

In FIGS. 13 and 14, the mass of the latch 8 is shown disposed generally to the left of the axis 41 of rotation for the latch. As shown in FIG. 15, the latch is carried on a pin 42 bearing in the side walls of the latch housing 24. Hence, the latch tends to rotate counterclockwise because of its weight distribution into a latching position as shown in FIG. 14 when not opposed by a plunger 44. In addition to gravity, or in lieu thereof, latching movement of the latch may be assisted by a spring (not shown) acting between the latch and the housing 24. The plunger acts on an arm 45 of the latch. The plunger 44 is urged downwardly by a spring 46 housed in a vertically elongate recess of the housing 24. As shown, the plunger, through its detent 47, tends to position the latch against the arm 23 when the spreader is supported in the clear of the container. However, as soon as the spreader is lowered into the proximity of the container, the foot 48 of the plunger engages the top surface 16 of the socket and pushes it upwardly within the housing 24 as the spreader progresses to the position shown in FIG. 14. Such retraction of the plunger permits the eccentric weight of the latch to rotate counterclockwise into a position disposing a downwardly extending concavity 51 of an S-shape lateral surface of the projection 8 underneath a downwardly extending lobe 11 providing a convex surface 52 partly defining an S-shaped lateral surface 53 of the pocket 32. A slight lift of the spreader then engages the concavity with the lobe 11 to interlock the latch with the socket.

A clearance 55 established at lifting position of the spreader and the container, as shown in FIG. 14, facilitates the movement of the latch into or out of coupling relation with the lobe 11. That is to say, uncoupling of the latch is accomplished by lowering the spreader relative to the container until the clearance 55 is at least substantially closed. A pull-cord 56 is then drawn to rotate a bell-crank 57 which, by lifting a pin 58 of the latch, forces the latch into the position shown in FIG. 13. As the spreader lifts away from the container, the plunger 44 descends into engagement with the arm 45. Thereafter the latch is maintained against the backstop surface 35 and the pull cord 56 may be released.

As additional details of the latch and socket structures, the lower V-shaped end portion of the latch is beveled along the side thereof, facing inwardly of the spreader at 61, to increase its gathering ability in the lateral direction over that provided by the socket surface 20.

The neb 62 of the latch is tapered toward its tip in a generally horizontal direction at 63 to facilitate entry of the neb into that portion of the pocket 15 located behind a web 64 extending vertically and forming a portion of the outer surface 17 of the socket 10. As shown in FIG. 2, the web 64 is tapered in a horizontal direction to facilitate entry of the neb. The web 64 positively holds the latch in its latched position from disengaging from the socket in a lateral direction. Cavities are provided at 68 and 69 pursuant to an invention not herein described.

FIG. 5 illustrates a container 70 comprising sockets 71 and 72 incorporated in the frame work of the container inwardly in a lengthwise direction of the container from its corners. This construction is desired when used in a longer container than that shown in FIG. 1 wherein the sockets are at the corners but permit both containers to be served by the same spreader 4. The internal contours of the sockets 71, 72 are thus identical with those of the sockets 9 and 10. The major difference between the sockets 71, 72 and those of FIG. 1 is that the sockets of the earlier described container 5 are extended in a horizontal direction to provide a larger area in the top surface of the socket and an exterior corner portion of substantial thickness in the horizontal direction at 74.

In the normal use of such containers, as well as those of FIG. 5, one container is frequently stacked on top of another with the lower corner portions of the top container in registry with the upper corner portions of the container on which it is placed. It is intended that the weight of the upper container be transmitted primarily to those portions of the lower container which are best able to resist column loading, namely, the vertical corner sections, each of which normally includes a heavy vertical frame member. When the sockets are located inwardly of the length of the container as found in FIG. 5, corner seating areas are provided for stack-loading means, such as pads 75. The upper bearing surfaces 76 of these pads are raised with respect to the adjoining frame members 78 and 79 in the same manner as shown with respect to pockets 9 and 10 of the container 5 in order that vertical loading may be transmitted substantially to the corners of the under container.

In stacking longer containers, such as exemplified by container 70, it may be desirable to distribute vertical loading to some extent to points inwardly of the corners of the under container. Hence, the sockets 71, 72 may be raised relative to adjoining frame members in a manner similar to the pad 75. As the loading on the sockets 71, 72, if any, it not as concentrated as found in the container 5, the upper seating surface need not be as extensive. Another reason for the more extensive seating surfaces of the sockets 9 and 10 of container 5 is that in actual stacking operations, precise registry of the corner portions of stacked containers is not attained as a practical matter. Therefore larger areas are needed at the corner portions to prevent damage to adjacent portions of the container through poor stacking practice.

FIG. 12 illustrates the manner in which horizontal frame members 81, 82, and 83, and a vertical frame member 84 are joined to a socket such as socket 71. When the container materials are of metal, joining of the frame members to a socket is effected preferably by welding. This is likewise true when incorporating the pads 75 into the container structure. The pads are illustrated as having cavities for a purpose not discussed herein and associated with an invention not properly included herein.

The container lifting arrangements herein disclosed are essentially concerned with facilities which are applicable to cargo containers of any practical lengths. That is, the sockets of the container are adapted for corner or longitudinally inward positions without impingement on cargo space, or imposing unwanted twisting forces on the framework of the container. The facilities disclosed are, moreover, designed to provide positive entrapped interlocking relationship and bearing areas assuring extended maintenance-free service.

The terms and expressions which have been employed are used as terms of description and not of limitation and there is no intention of excluding such equivalents of the invention described or of the portions thereof as fall within the scope of the claims.

What is claimed is:
1. Cargo handling equipment comprising:
   (A) a hoisting implement comprising:
      (1) a frame member;
      (2) a flat lifting latch pivotally mounted on the frame for movement about a horizontal axis, said latch extending downwardly from the member; and
      (3) a guide arm extending downwardly from said member in proximity to the latch;
   (B) a cargo container comprising a socket integrally contained in an upper corner portion of the container and defining a pocket which opens along the normally top and outer side surfaces of the container to an extent enabling the horizontal and vertical passage of the latch and the guide arm into the pocket when the latch and the arm are back-to-back;
   (C) said latch and said pocket having oppositely facing S-shaped surfaces providing a downwardly-extending socket convexity on the pocket wall and a downwardly-extending concavity on the latch rendering the socket and latch interlockable;
   (D) said guide being disposed in spaced relation with the latch when the latch is interlocked with said convexity, said latch being pivotable against the arm to function as a back stop therefor and to facilitate entry into the pocket; said arm and said latch, when engaged, constituting a guiding means enabling the implement to effect horizontal self-aligning movements with a container when coupling therewith.

2. The cargo handling equipment of claim 1 wherein: said S-shaped surface of the latch defines a neb thereof and said socket has a vertically-extending web along the outer side of the pocket overlying the portion thereof receiving said neb when a lobe of the socket defined by said convexity is received in said concavity.

3. The cargo handling equipment of claim 1 wherein:
   (A) the implement includes a housing for said lifting latch enclosing primarily the upper portion thereof, and axle means extends through the housing on which said latch is pivoted;
   (B) said socket has a downwardly-projecting lobe defined by said convexity and received by said concavity when the implement and the container are coupled;
   (C) said arm has a terminal surface extending downwardly and laterally toward the latch cooperating with and extending toward, when the latch and the arm are juxtaposed, a correspondingly sloped terminal surface of the latch to facilitate self-aligning downward and horizontal movements of the implement relative to the coupler in coupling therewith;
(D) a plunger is movable into and out of the underside of the housing for engaging a top surface of the socket;
(E) stop means on the housing and the plunger limits movement of the plunger outwardly of the housing;
(F) resilient means urges the plunger outwardly of the housing;
(G) detent means on the plunger and the latch cooperate to carry the latch against said back stop as said plunger reaches its maximum outward position; and
(H) said latch is vertically and horizontally movable within said pocket to disengage from said lobe.

4. The cargo handling equipment of claim 3 wherein: the latch and the housing extend above the axis of the latch with the inner housing sides lying in planes which are transverse to the pivotal axis of the latch and in guide relation with the opposite sides of the upper part of the latch.

5. Cargo handling equipment according to claim 1 wherein:
the latch has a portion extending above the axis and said implement comprises means disposed above said axis and along planes which are transverse to said axis, and in guide relation with the upper part of the latch to limit movement of the latch relative to the plane lengthwise of said axis.

6. The cargo handling equipment of claim 1 wherein:
(A) said latch terminates downwardly in a V-shaped surface for cooperating with the upper entrance periphery of the pocket in self-aligning movements during descent of the latch into the pocket;
(B) the implement comprises means for urging the latch into engagement with the arm; and
(C) said arm has an end-surface sloping downwardly and toward the latch and toward the upper extremity of the V-shape latch surface to cooperate with the V-shape surface in said self-aligning movements of the implement.

References Cited by the Examiner
UNITED STATES PATENTS 3,078,115   2/1963   Harlander _____ 294—67
3,151,904   10/1964  Tantlinger _____ 294—67

HUGO O. SCHULZ, *Primary Examiner.*

GERALD M. FORLENZA, *Examiner.*

G. F. ABRAHAM, *Assistant Examiner.*